Dec. 23, 1952 E. S. SHEFFIELD, JR., ET AL 2,622,734
APPARATUS FOR PROCESSING CRUSHED PINEAPPLE
Filed March 24, 1949 6 Sheets-Sheet 1

INVENTORS
EUGENE S. SHEFFIELD, JR.
MARVIN BAINBRIDGE
BY
Lyon & Lyon
ATTORNEYS

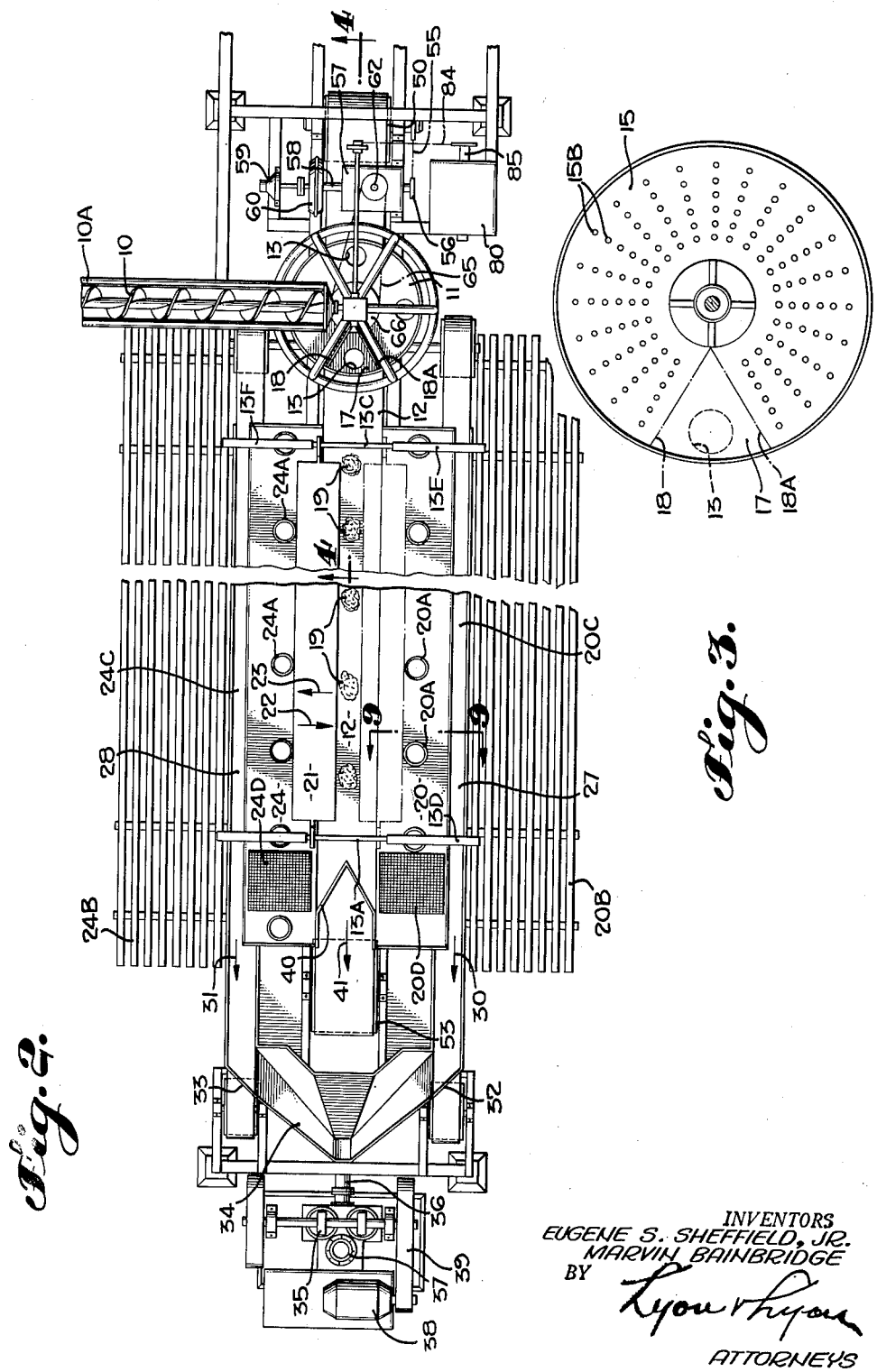

Dec. 23, 1952  E. S. SHEFFIELD, JR., ET AL  2,622,734
APPARATUS FOR PROCESSING CRUSHED PINEAPPLE
Filed March 24, 1949  6 Sheets-Sheet 3
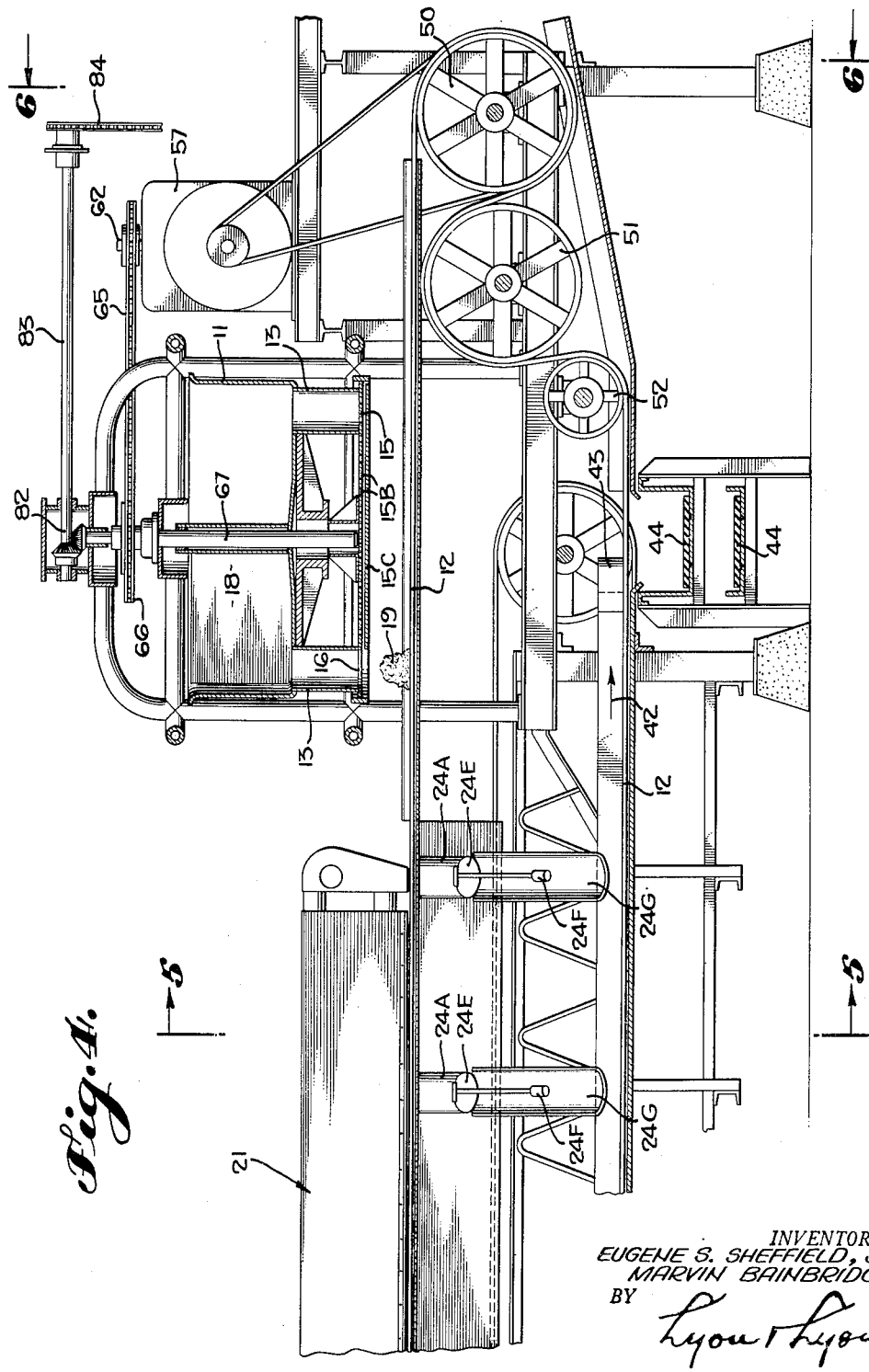
INVENTORS
EUGENE S. SHEFFIELD, JR.
MARVIN BAINBRIDGE
BY
Lyon & Lyon
ATTORNEYS INVENTORS
EUGENE S. SHEFFIELD, JR.
MARVIN BAINBRIDGE
BY
*Lyon & Lyon*
ATTORNEYS Dec. 23, 1952     E. S. SHEFFIELD, JR., ET AL     2,622,734
APPARATUS FOR PROCESSING CRUSHED PINEAPPLE
Filed March 24, 1949     6 Sheets-Sheet 5
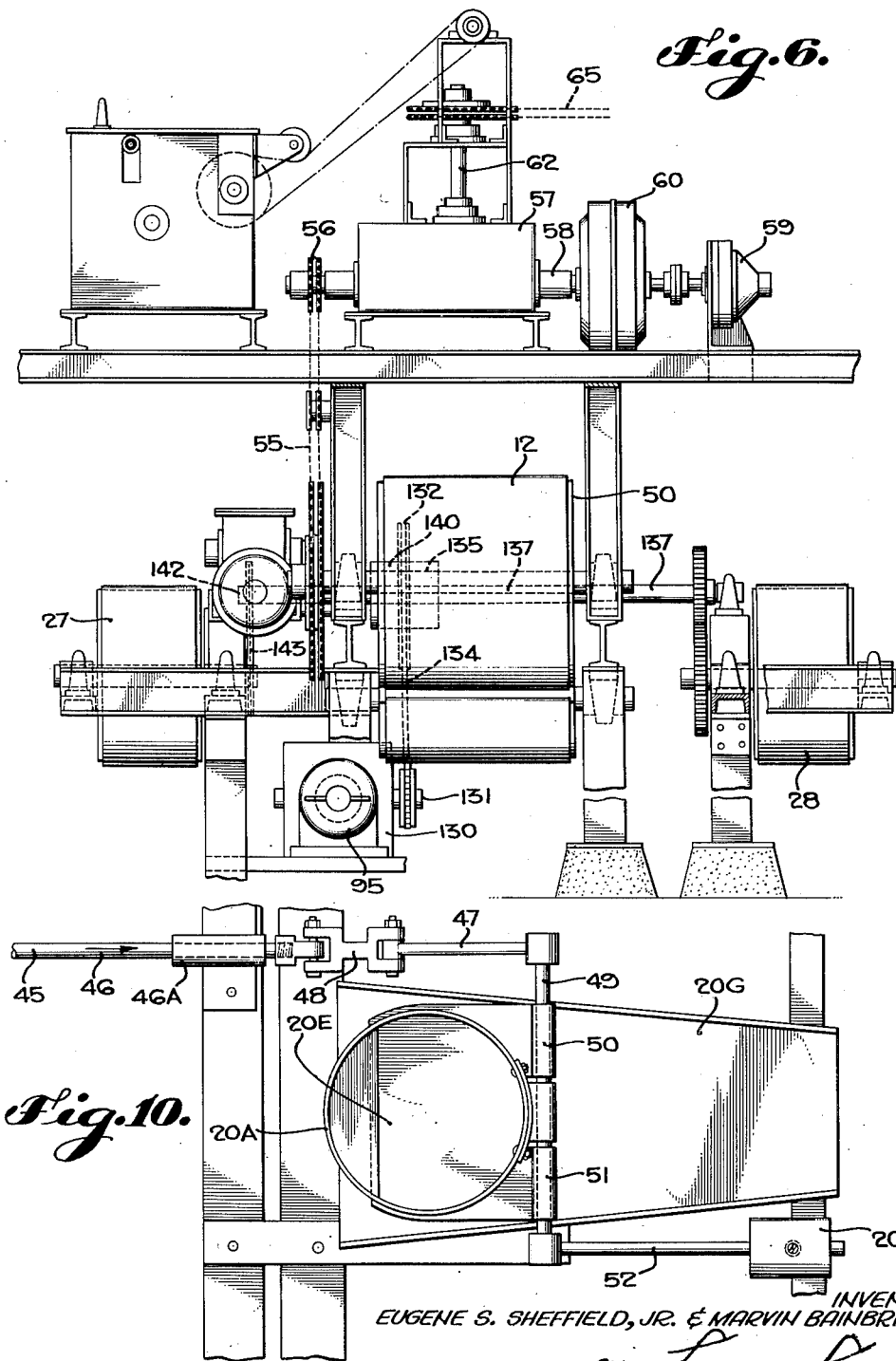
INVENTORS
EUGENE S. SHEFFIELD, JR. & MARVIN BAINBRIDGE
BY Lyon & Lyon
ATTORNEYS Dec. 23, 1952   E. S. SHEFFIELD, JR., ET AL   2,622,734
APPARATUS FOR PROCESSING CRUSHED PINEAPPLE
Filed March 24, 1949   6 Sheets-Sheet 6
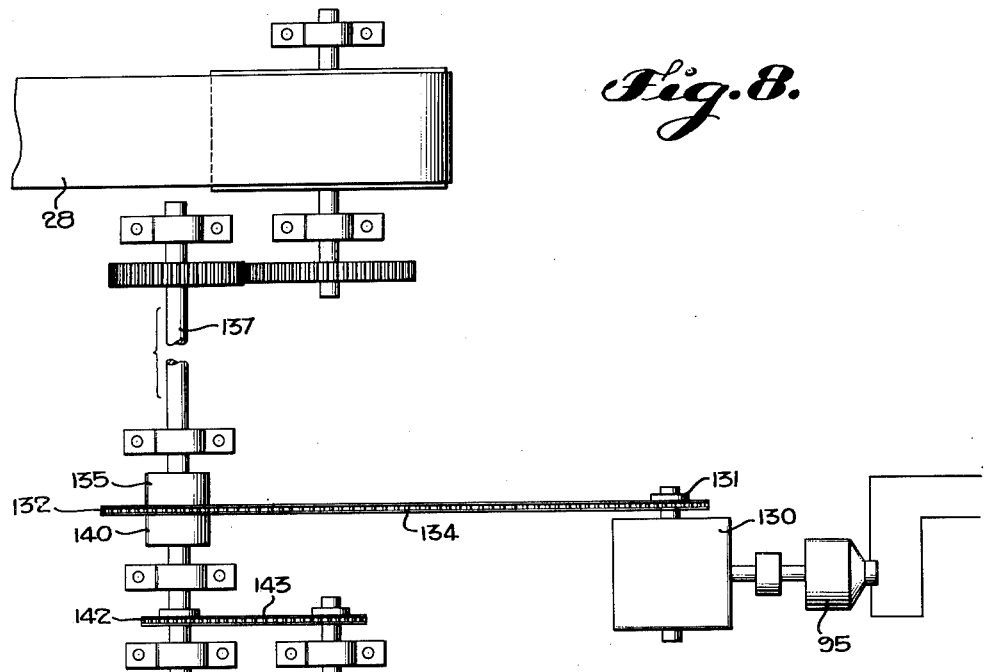
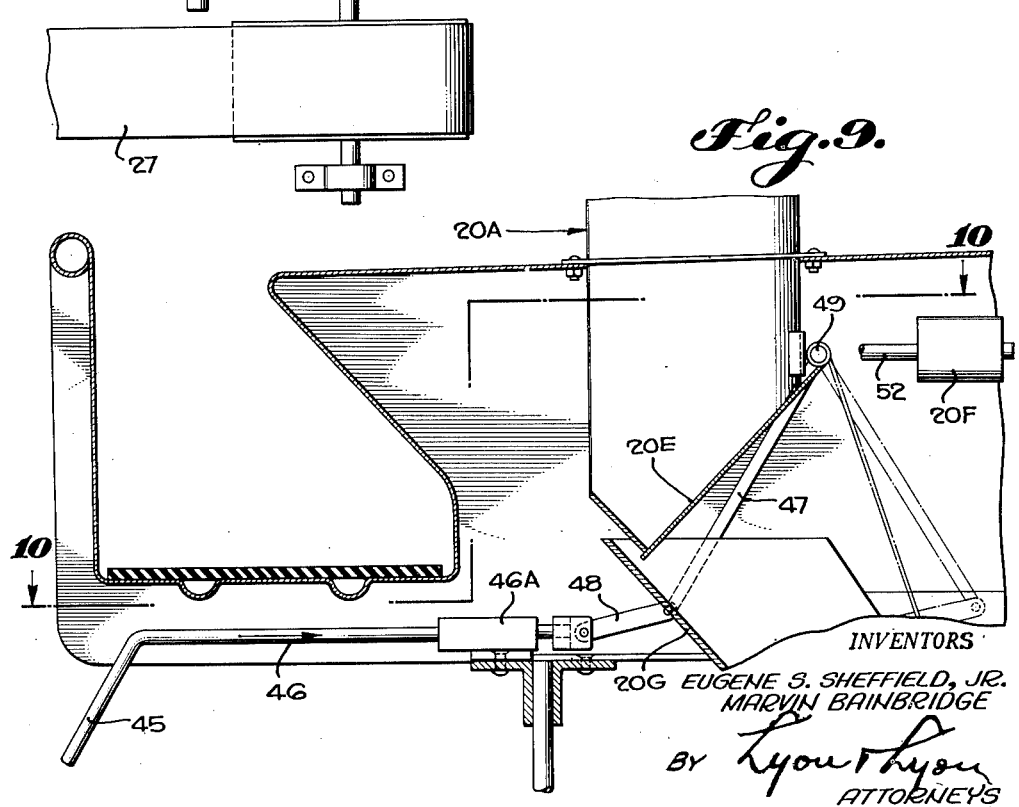

Patented Dec. 23, 1952

2,622,734

UNITED STATES PATENT OFFICE 2,622,734

APPARATUS FOR PROCESSING CRUSHED PINEAPPLE

Eugene Sherwood Sheffield, Jr., and Marvin Bainbridge, Kahului, Territory of Hawaii, assignors to Maui Pineapple Company, Ltd., Honolulu, Territory of Hawaii, a corporation of the Territory of Hawaii Application March 24, 1949, Serial No. 83,134

5 Claims. (Cl. 209—125)

The present invention relates to an improved method and related apparatus for processing crushed pineapple.

In accordance with conventional practice, after a pineapple has been sized, it is subjected to a machine arranged to extract the core of a pineapple and to also cut the cylindrically shaped portion from the center of the pineapple, such cylindrically shaped portion then being sliced to obtain sliced pineapple in the form purchased, as such, on the market.

Because of the irregular shape of the pineapple, there is still considerable pineapple meat left adhering to the shell of the pineapple after the above-mentioned process is carried out. This pineapple meat adhering to the shell is cut therefrom in the form of crushed pineapple and marketed as shell crushed pineapple. It is called shell-crushed pineapple because it is the crush that is taken from the shell of the pineapple after, initially, the center cylinder of the pineapple has been removed.

In the process of obtaining or extracting this pineapple meat in the form of shell crushed pineapple, it is not uncommon for the shell crushed pineapple to include small portions of the pineapple eyes and pieces of outer pineapple shell which are of brown or greenish-brown color. These pineapple eyes and shell pieces are desirably picked out and removed from the crushed pineapple for obvious reasons.

The present invention relates particularly to the method and related apparatus whereby such pineapple eyes and shell pieces are removed from the crushed pineapple.

In accordance with conventional practice, the shell crushed pineapple is disposed on a moving belt passing individuals who pick out the undesirable pineapple eyes and shell portions as the crushed pineapple passes by. This conventional method has been found not too satisfactory as the moving belt produces tiring results on the individuals and, in some cases, dizziness. Further, more important, there is no definite allocation of portions of such pineapple to such individuals and the quality of their work may not be checked so that, as a result, oftentimes such individuals would pick only that portion of the crushed pineapple from which he desired to remove the eyes and shell portions; and, also, oftentimes such individuals would discard relatively large amounts of crushed pineapple in the process of removing the eyes and shell portions.

It is, therefore, an object of the present invention to provide an improved method and apparatus useful in the above indicated process of removing pineapple eyes and shell portions from crushed pineapples which is very helpful in obtaining crushed pineapple free from such eyes and shell portions.

Another object of the present invention is to provide an improved method and apparatus for the purpose indicated above, characterized by the fact that the individuals who separate the pineapple eyes and shell portions are not subjected to the eye strain and to other tiresome effects which result from continually watching a moving conveyer belt.

Another object of the present invention is to provide an improved method and apparatus for the purpose indicated above characterized by the fact that the individuals who separate the pineapple eyes and shell portions have a definite responsibility and their work may be quality checked.

Another object of the present invention is to provide an improved method and apparatus characterized by its simplicity and its adjustment to accommodate different numbers of such individuals, as occasion may demand, the apparatus functioning to allocate a predetermined amount of unprocessed crushed pineapple to such individuals periodically.

Still another object of the present invention is to provide an improved apparatus for the purpose indicated which serves to allocate definite predetermined approximately equal amounts of unprocessed crushed pineapple to a plurality of individuals and which allows a quality check of their work.

Still another object of the present invention is to provide an improved apparatus for the purpose indicated characterized by the fact that the crushed unprocessed pineapple is proportioned out onto a moving belt by a time-controlled device according to the number of individuals present, the device incorporating a hydraulically operated wiper arranged to push over in front of each individual the measured portion of unprocessed crushed pineapple so as to impose a definite responsibility on each one of such individuals to see that such measured portion is properly cleaned; a first subsidiary object being that a refuse container is disposed adjacent each individual into which the pineapple eyes and shell portions are placed for direct supervision as to the amount of wastage; a second subsidiary object being that the processed pineapple is disposed in a position for direct supervision as to the amount of pineapple eyes and shell portions removed therein, if any.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figures 1 and 2 are respectively a view in side and plan elevation of the apparatus embodying the present invention, the use of which the present novel method may be practiced.

Figure 3 shows in an enlarged form, a portion of the apparatus shown in Figure 2.

Figure 4 is a sectional view taken substantially on the line 4—4 of Figure 2.

Figure 6 is a view in end elevation taken substantially in the direction indicated by the arrows 6—6 in Figure 4.

Figure 8 is a view showing the manner in which the carry away conveyor belts are moved alternately.

Figure 9 is an enlarged view taken substantially on the line 9—9 of Figure 2 and showing details of the mechanism for moving the pivoted bottom member of the refuse container.

Figure 10 is a view in plan elevation of the mechanism shown in Figure 9 taken substantially in the direction indicated by the arrows 10—10 in Figure 9.

Figure 1:
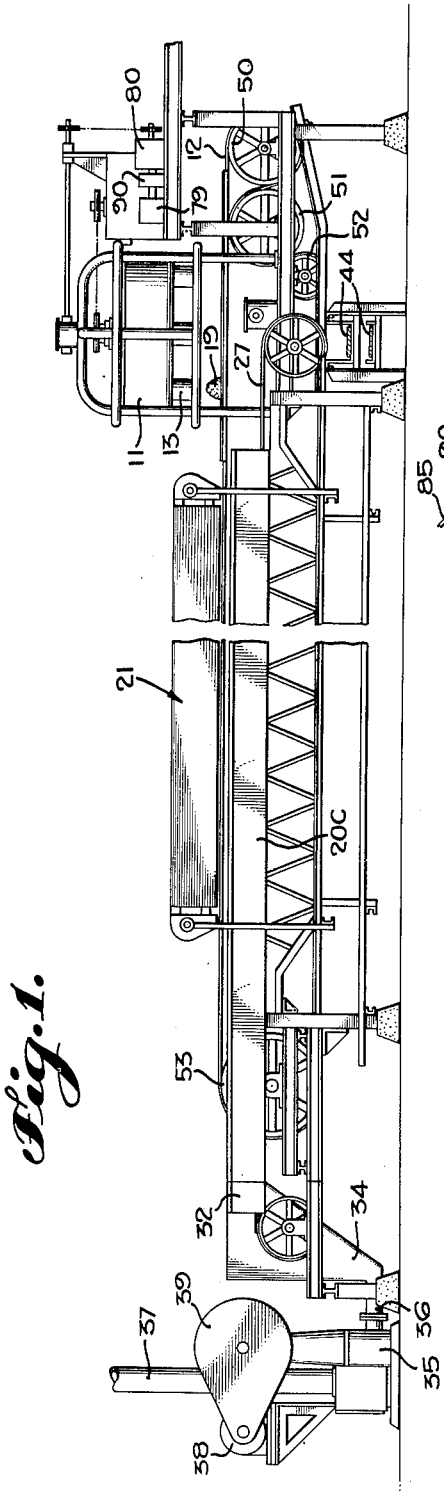

In accordance with the present invention, the unprocessed crushed pineapple including therein the undesired pineapple eyes and shell portions is fed upwardly into an elevated position by the screw feeding member 10, rotatable about its longitudinal axis into the rotatable bowl-shaped container 11 which serves as a proportioner. Definite amounts of such unprocessed pineapple are periodically dispensed from the container 11 onto the traveling belt 12 by the use of the four measuring containers 13, each rotatable with the large container 11 and each measuring container being bottomless and cooperating with the stationary bottom plate 15 which is apertured at 16, as shown in Figure 5, to allow the crushed pineapple in the measuring container 13 to drop onto the endless belt 12.

Figure 5:
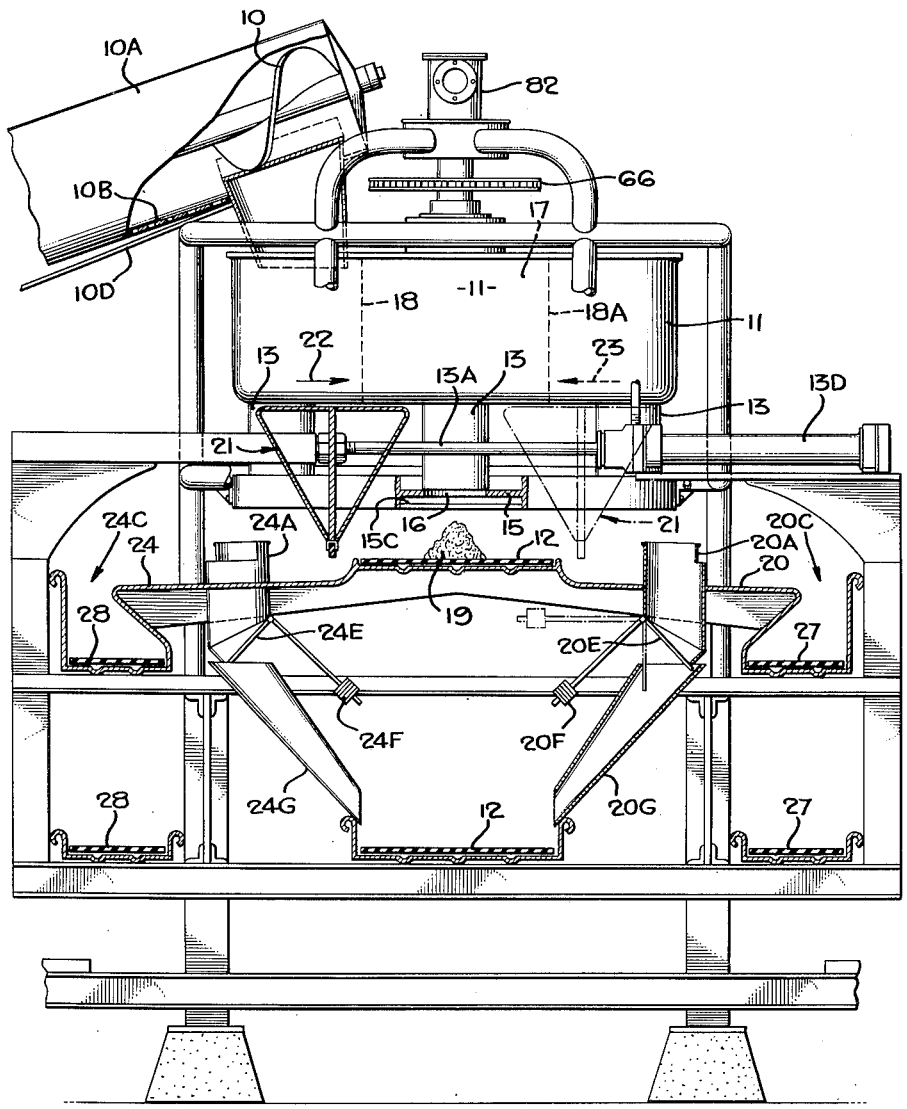
Figure 5 is a sectional view taken substantially on the line 5—5 of Figure 4.

In the position shown in Figure 5, the center measuring container 13 is disposed over the belt 12 and under the sector 17 (Figure 3) defined by the radially extending vertically disposed plates 18, 18A. The purpose of these plates 18, 18A is to prevent crushed pineapple from entering the sector 17 in the container 11, other than that which is in the measuring container 13 so that only crushed pineapple in the measuring container 13 is deposited on the traveling belt 12. The belt 12 is driven in timed relationship or in synchronism with rotation of the container 11 and attached bottomless measuring containers 13, in a manner described hereinafter, so that a series of piles of unprocessed pineapple is disposed on the belt 12 as indicated by the piles 19. Such series of piles 19 of unprocessed pineapple may then be shoved off the conveyor belt 12 onto the work table 20, in Figure 3, by the wiper 21 which is movable from its position shown in Figure 2 in the direction indicated by the arrow 22. The hydraulic means whereby the wiper 21 is thus moved is described hereinafter, but, in general, once the wiper 21 is moved to shove the pineapple piles 19 onto the work table 20, the wiper 21 remains stationary until another series of piles 19 are disposed on the belt 12 after which the wiper 21 is again moved, but in the direction indicated by the arrow 23 to shove the pineapple piles onto the work table 24.

It is thus seen that the work tables 20 and 24 extend along substantially the full length of the apparatus upon opposite sides thereof. These work tables 20, 24, as shown in Figures 2 and 5, have a series of spaced refuse containers 20A, 24A stationarily mounted thereon and extending upwardly therefrom, there being one refuse container 20A, 24A for each of the individuals who stand on the steel grating 20B, 24B.

The pineapple piles 19 are automatically spaced on the conveyor belt 12 a distance apart equal substantially to the distance between adjacent refuse containers 20A or to the distance between adjacent refuse containers 24A.

Thus, when the wiper 21 moves in the path 22, 23, as the case may be, the pineapple piles 19 dispensed onto the conveyer belt 12 are pushed in front of the individual workers onto the corresponding work tables 20, 24, as the case may be. Thus, each individual worker has allocated to him or her a measured quantity of unprocessed pineapple. After the pineapple is thus disposed on the work table 20, 24, the individual workers pick out the pineapple eyes and shell material and deposit the same into the refuse containers 20A, 24A, as the case may be, to thereby process the pineapple free of such eyes and shell portions. After such processing, the individual worker pulls the processed pineapple in the direction towards him or her to allow the processed pineapple to fall into the corresponding trough 20C, 24C, the bottom of such troughs 20C, 24C comprising a corresponding endless conveyor belt 27, 28.

These belts 27, 28 are movable in the directions indicated by the corresponding arrows 30, 31 to carry the processed pineapple into a position adjacent the deflector plates 32, 33 which serve to direct the processed pineapple to the centrally disposed hopper 34, from the bottom of which it is pumped by the pump 35 from the inlet conduit 36 to the outlet conduit 37. The pump 35 is driven by the motor 38 through the belt drive disposed within housing 39. Thus, the conduit 37 serves to deliver the processed pineapple to a different station.

The belts 27, 28 are each operated synchronously and intermittently in the manner described hereinafter to allow a supervisor to make periodic inspections of the crushed pineapple in the troughs 20C, 24C to thereby provide a quality check on each individual worker. Any unprocessed pineapple material which is not shoved off the belt 12 by the wiper 21 is subsequently directed onto the perforated tops 20D, 24D of the tables 20, 24 by the angularly disposed V-shaped pineapple directing member 40 so that the belt passing the member 40 in the direction indicated by the arrow 41 is free of pineapple material and juice. The tables 20, 24 are preferably perforated at 20D, and 24D to allow any excess juice to flow therethrough.

Also, in order to convey excess pineapple juice from the crushed pineapple in its travel through the apparatus, various expedients may be employed, for example, the tube 10A through which the pineapple is fed by the screw feed 10 may be perforated at 10B and a trough-like member 10D may be disposed under the tube 10A to conduct such excess juices away to some convenient point. In similar fashion, the stationary plate 15 (Figures 3 and 5) forming the bottom of the bottomless measuring containers 13 may be perforated as shown at 15B to allow excess pineapple juice to flow through such perforations onto a pan 15C under the plate 15, which pan 15C serves to conduct such excess juice to some convenient location.

Each one of the refuse containers 20A, 24A, as shown in Figure 5, has a pivoted bottom 20E, 24E, respectively, which is normally maintained in its closed position by the cantilever supported weights 20F, 24F, respectively. A supervisor may thus inspect the material disposed by the individual workers into the refuse containers 20A, 24A, and after making such inspection may operate the corresponding levers 45, shown in detail in Figures 9 and 10, to move the corresponding bottoms 20E, 24E to open position to allow the material in such containers to drop onto the corresponding chutes 20G, 24G which serve to convey such material onto the belt 12. In Figure 5, it is thus noted that the upper loop of the belt 12 serves to convey the unprocessed pineapple delivered thereto from the measuring container 13 while simultaneously the lower loop of the same belt 12 serves to convey the refuse initially deposited into the containers 20A, 24A. Such refuse carried on the lower loop of belt 12, traveling in the direction indicated by the arrow 42 in Figure 4, is deflected from such belt 12 by the deflector element 43 to direct such refuse to a point above the refuse conveyor belt 44 onto which it may fall and be conveyed to some convenient location.

As shown in Figures 9 and 10, the refuse containers represented by the refuse container 20E, may individually be emptied by a supervisor after inspection by moving the handle 45 in the direction indicated by the arrow 46, the handle 46 being slidably mounted in its guide and having its inner end connected to one end of the crank 47 through the connected link 48 and with the other end of crank 47 attached to one end of the shaft 49. The intermediate portion of the shaft 49 is journalled in the bearings 50, 51 and also has attached thereto the bottom member 20E which is normally biased in closed position by the weight 20F acting through lever 52 on the shaft 49.

It is apparent that the various conveyer belts mentioned previously may be driven in different manners and the ones described herein are merely exemplary which may be used. The main conveyor belt 12 passes in turn over the driving roller 50, tensioning roller 51, idler roller 52, and the roller 53 (Figure 1) rotatably mounted at the other end of the machine in Figure 1. The driving roller 50, as shown in Figures 2 and 6, is driven by the chain 55 passing over the driving sprocket 56 on the output shaft of the bevel gear reduction box 57, the input shaft 58 of which is coupled to the hydraulic driving motor 59 through the planetary reducer 60. A second output shaft 62 of the gear box 57 serves to drive the sprocket chain 65 passing over the driven sprocket 66 (Figure 4) mounted on the same shaft 67 as is the proportioning container 11 with its attached measuring containers 13. Thus, the motor 59 serves to drive the belt 12 and proportioning container 11 synchronously in timed relationship.

The hydraulic motor 59 may be supplied with fluid under pressure from the variable displacement pump 70 (Figure 7), the motor 59 being connected to the high pressure side of the pump 70 through the flow control valve 72, while the return side of the motor 59 is connected to the return side of the pump 70. Since the flow control valve 72 is adjustable it may be regulated to change the speed of the motor 59 and, thus, also the speed of the belt 12 and proportioning container 11. This feature is of importance in regulating the output of the overall table to correspond with the incoming flow of unprocessed crushed pineapple.

Figure 7:
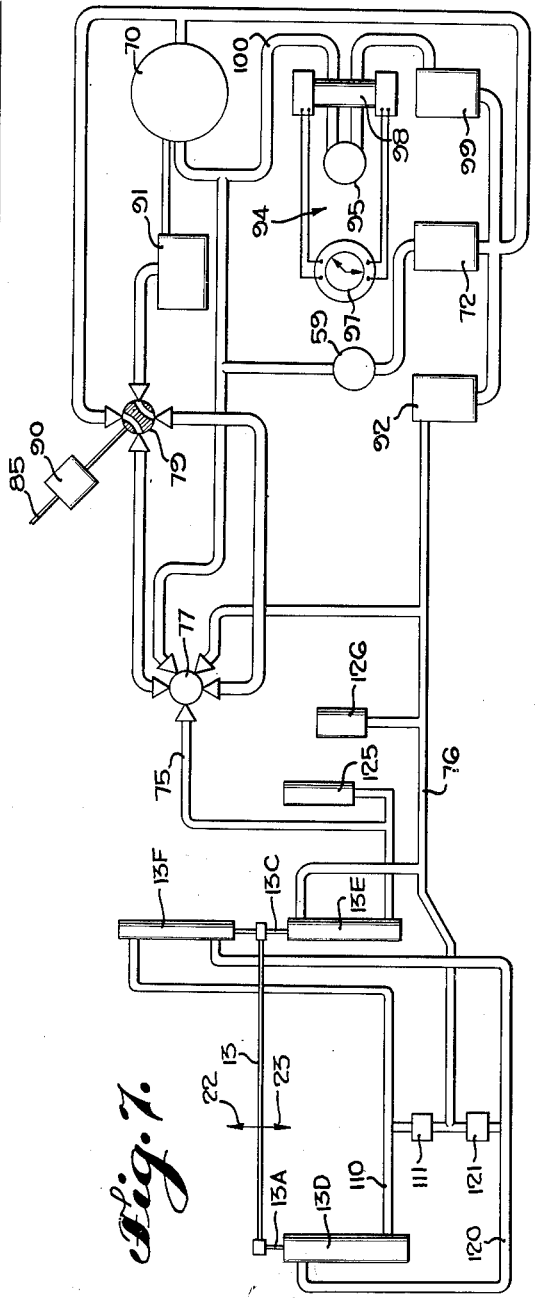
Figure 7 is a schematic diagram of the electrically controlled hydraulic system incorporated in the apparatus illustrated in the previous figures.

The wiper 21 (Figure 2) movable in the direction indicated by the arrows 22, 23 is also operated hydraulically. The wiper 21 is supported at its ends on piston members 13A, 13C, forming a part of double acting piston cylinder assemblies 13A, 13D; 13C, 13E; 13C, 13F. The cylinders 13D, 13E and 13F, as shown in Figure 7, are connected to conduits 75, 76 in such manner that the piston members 13A, 13C may be moved in reverse directions to produce the desired movement of wiper 13. For this purpose, the line 75 is connected to the pilot operated four-way valve 77, having as its control element the pilot valve 79.

It is noted that only one power cylinder 13E is directly operated from the control pump. The cylinder 13D in which pressure is developed to drive the other end of the wiper 13 is fed with oil which is forced out of the cylinder 13F. Such oil, after being forced out of cylinder 13F, is forced into the cylinder 13D located on the same side of the table as cylinder 13E, thus synchronizing the movement of both ends of the wiper 13. In other words, ports of the cylinders 13F, 13D are interconnected through lines 110, 120. In order to assure synchronous movement, by maintaining lines 110, 120 filled with oil each one of the lines 110, 120 is ported to line 76 respectively through the normally closed valves 111, 121 which remain closed except when oil is being delivered to lines 110, 120. Spring loaded shock absorbers 125, 126 may be connected respectively to lines 75, 76.

The repetition rate at which the piston members 13A and 13C are reversed is controlled by the pilot valve 79 mounted in the timing box 80. The pilot valve 79 is controlled in accordance with the number of revolutions turned by the proportioning container 11. For this purpose, the pilot valve 79 in timing box 80 is geared to the shaft 67 of the proportioning container 11 through the bevel gear assembly 82, shaft 83, and sprocket chain 84 which is coupled to the shaft 85. The shaft 85 drives the control element of valve 79 through the adjustable gear train 90. The timing box 80 is provided with a removable lid to allow access to the adjustable gear train 90 between shaft 85 and the valve 79. By changing the gear ratio of the gear train 90, it is apparent that operation of the valve 79 may be speeded up or retarded as the occasion may demand.

Such gear train 90 in box 80 is adjusted in accordance with the number of individual workers disposed along tables 20 and 24. In other words, after the proportioning container 11 has rotated a sufficient number of revolutions to dispose a predetermined number of pineapple piles 19 on the belt 12, equal to the number of persons on each side of the tables 20, 24, the wiper 21 is actuated. In the event that it is desired to accommodate more workers, the speed of operation of valve 79 is retarded to allow a greater number of pineapple piles 19 to be deposited on the belt 12 before the wiper 21 is actuated. At the same time, it may be desired to speed up the proportioning container 11 to provide compensation for the increased number of workers, it being noted that a worker requires a predetermined time, yet which is variable in accordance with the condition of the unprocessed pineapple, to properly dispose of the pineapple pile allocated to him or her, so that if the number of workers is increased, the speed of the belt 12 should likewise be increased if the worker is to operate again within such predetermined period of time. The belt 12 may be speeded up for this purpose by adjustment of the flow control valve 72, as indicated hereinabove. In other words, a control of the proportioning container and belt is based upon the number of workers on the table and the condition of the fruit upon which they have to work. Certain crushed pineapple needs more work performed on it than others, in that there may be a greater number of discolored specks and eyes, and when this condition exists, the operation of the table and the feeding out of the unprocessed fruit is controlled to allow complete performance of the particular task.

Further details of the hydraulic system, shown in Figure 7, appear self-explanatory, it being noted that such system includes a reservoir 91 connected to the valve 79, a flow control valve 92 connected to line 76, and a timing circuit 94 for operation of the reversible oil motor 95 arranged, as shown in Figures 6 and 8 to alternately drive the belts 27, 28. This motor 95 is driven intermittently in predetermined time intervals determined by the setting of the electric timer 97. The timer 97 is of the type in which its on-period and off-period may be adjusted and is operatively connected to the solenoid operated four-way valve 98 arranged to intermittently and reversably control the operation of motor 95, it being noted that valve 98 is connected through the flow control valve 99 to the high pressure side of pump 70 and also through conduit 100 to the low pressure side of pump 70.

The flow control valves 72, 92 and 99 may be of conventional type for serving the intended indicated purpose.

Figure 8 indicates the manner in which the take away belts 27, 28 are alternately and individually moved by the oil motor 95. When the motor 95 is driven in one direction one of the belts 27, 28 is driven; and when the motor 95 is driven in the other direction the other one of the belts 27, 28 is driven. The output shaft of motor 95 is coupled to the gear reduction box 130, the output shaft 131 of which is arranged to drive the sprocket wheel 132, through chain 134. The sprocket wheel 132 is coupled through the one-way free wheeling indexing clutch 135 to shaft 137 to drive the belt 28 when the sprocket wheel '32 is driven in one direction; and when the sprocket wheel 132 is driven in the opposite direction, a clutch 140, similar to clutch 135 serves to drive the belt 27 through shaft 142, and chain 143. In other words, the clutches 135, 140 are so arranged to produce motion of either belt 27 or 28 individually depending upon the direction of rotation of the motor 95.

Thus, the motor 95 when operating in one direction operates the carry away conveyor belt 27 on one side of the table, and when operating in the other direction operates the other conveyor belt 28 on the other side of the table. By so alternately moving the belts 28, 27 there may be a longer interval of idle time of each conveyor belt during which inspection may be made; but, with the net result that substantially a continuous flow of processed fruit is delivered. Further, motor 95 need not be as large as if, for example, both belts 27, 28 were moved simultaneously.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In an apparatus of the character described, a continuously movable conveyor belt, work tables on opposite sides of said conveyor belt, means adapted to dispose a series of equally spaced piles of equal volumes of material on said belt, means adjusting the last mentioned means to control the number of piles disposed on said belt, and a reciprocal wiper extending substantially the full reach of said belt and arranged for transverse movement with respect to said belt to displace said material from said belt onto either one of said work tables, means normally maintaining said wiper in a stationary position adjacent one edge of said belt, and means arranged to automatically and alternately move said wiper from one edge of said belt to the other edge of said belt, and vice versa, in timed relationship with movement of said belt.

2. In an apparatus of the character described, an endless conveyer belt movable past different stations, each manner by an individual, dispensing means driven synchronously with said belt and arranged to periodically dispense onto said belt equal amounts of material spaced equal distances along said belt, means automatically operated after a predetermined number of said amounts are dispensed on said belt to move said amounts to said stations, whereby the corresponding individual has a predetermined time interval within which to properly dispose of an allocated amount of material, said last mentioned means including means for adjusting the same to allow different numbers of said amounts to be dispensed on said belt before said piles are moved to said stations, and said first mentioned means including means for adjusting the same to allow different numbers of workers the same predetermined time interval within which to properly dispose of an allocated amount of material.

3. In an apparatus of the character described, an endless conveyer belt movable past a plurality of stations, dispensing means arranged to dispense equal amounts of material onto said belt at equally spaced distances therealong on the upper loop of said belt, each one of said stations comprising a work table, chute means between said work table and the lower loop of said belt, means automatically operated after a predetermined number of said amounts of material are dispensed onto the upper loop of said belt for moving said piles of material to said stations, means adjusting the last mentioned means to control the number of piles dispensed on said belt, and additional conveying means operatively associated with said lower loop of said conveyer belt arranged to convey material therefrom.

4. In an apparatus of the character described, an endless moving conveyor belt, a workbench disposed along said belt having a plurality of stations therealong, dispensing means arranged to dispense equal amounts of material onto said belt at spaced points therealong, means adjusting said dispensing means to control the number of equal amounts of material dispensed on said belt, means automatically operated after a predetermined number of amounts of said material have been dispensed on said belt to move all of said piles of material onto said work bench simultaneously, the front edge of said work table comprising a trough with a movable bottom, said movable bottom comprising a movable conveyor belt, means moving the last mentioned conveyor belt intermittently.

5. In an apparatus of the character described, an endless continuously movable conveyor belt, a work table on opposite sides of said belt, the front edges of each one of said tables comprising a trough member with a movable bottom, said movable bottom comprising a second endless belt, said second endless belt being moved intermittently, a hopper centrally disposed along the axis of said first belt, means arranged to direct the flow of material carried on the trough belt into said hopper, dispensing means arranged to dispense equal amounts of material at equally spaced distances along said belt, means automatically operated after a predetermined number of said amounts are dispensed onto said belt to remove said amounts of material therefrom onto one of said work tables, said last mentioned means comprising a reciprocal wiping element movable laterally with respect to movement of said first belt, said belt comprising a lower loop, material chute means between the upper surface of said table and said lower loop, the wiper actuated means being adjustable to automatically operate after different amounts of material are dispensed onto said belt to accommodate different numbers of workers stationed along said table, and said first belt and associated dispensing means being adjustable to allow the same time interval between successive operations of said wiping means regardless of the number of stations being supplied with material along said work table.

EUGENE SHERWOOD SHEFFIELD, JR.
MARVIN BAINBRIDGE.

REFERENCES CITED

The following references are of record in the file of this patent:

UNITED STATES PATENTS

| Number | Name | Date |
|---|---|---|
| Re. 15,813 | Kuhn | Apr. 8, 1924 |
| 825,667 | Latchford | July 10, 1906 |
| 1,395,727 | Odermatt | Nov. 1, 1921 |
| 1,456,029 | Mills | May 22, 1923 |
| 2,269,827 | Mendoza | Jan. 13, 1942 |
| 2,322,190 | Fleming | June 15, 1943 |